US012710379B2

(12) United States Patent
Kim et al.

(10) Patent No.: US 12,710,379 B2
(45) Date of Patent: Aug. 18, 2026

(54) IMAGE PROCESSING APPARATUS AND IMAGE PROCESSING METHOD

(71) Applicant: MEDIT CORP., Seoul (KR)

(72) Inventors: Jin Young Kim, Seoul (KR); Dusu Kim, Seoul (KR)

(73) Assignee: MEDIT CORP., Seoul (KR)

( * ) Notice: Subject to any disclaimer, the term of this patent is extended or adjusted under 35 U.S.C. 154(b) by 308 days.

(21) Appl. No.: 18/453,520

(22) Filed: Aug. 22, 2023

(65) Prior Publication Data

US 2024/0077430 A1 Mar. 7, 2024

(30) Foreign Application Priority Data

Sep. 5, 2022 (KR) ........................ 10-2022-0112348

(51) Int. Cl.
*G01N 21/954* (2006.01)
*G06T 7/64* (2017.01)

(52) U.S. Cl.
CPC ............. *G01N 21/954* (2013.01); *G06T 7/64* (2017.01)

(58) Field of Classification Search
CPC .. A61C 9/0046; A61C 9/0053; G01N 21/954; G06T 2207/30036; G06T 7/0012
See application file for complete search history.

(56) References Cited

U.S. PATENT DOCUMENTS 9,667,762 B1 * 5/2017 Takahashi ............... H04M 1/18
2004/0161726 A1 * 8/2004 Saito ........................ A61C 5/73 433/222.1
2007/0188490 A1 8/2007 Kanai et al.
2009/0079761 A1 * 3/2009 Kokojima ............ H04N 13/111 345/619
2015/0265372 A1 * 9/2015 Kim ....................... A61C 13/08 433/214
2019/0003830 A1 * 1/2019 Irie ........................ G01B 11/30
2021/0401550 A1 12/2021 Chang et al.

FOREIGN PATENT DOCUMENTS

EP 3175819 A1 6/2017
KR 10-2020-0109273 A 9/2020
WO 2020197133 A1 10/2020

OTHER PUBLICATIONS

Communication dated Mar. 25, 2024 issued by the European Patent Office in application No. 23194383.8.
Jong-Il Park et al., "A Three-Dimensional Image-Superimposition CAD/CAM Technique to Record the Position and Angulation of the Implant Abutment Screw Access Channel", The Journal Of Prosthetic Dentistry, 2013, vol. 109, Issue 1, pp. 57-60 (4 Pages Total).
Office Action issued Aug. 28, 2024 in Korean Application No. 10-2022-0112348.

* cited by examiner

*Primary Examiner* — Ming Wu
(74) *Attorney, Agent, or Firm* — Sughrue Mion, PLLC

(57) ABSTRACT

Provided are an image processing method and an image processing apparatus. The image processing method includes obtaining scan data by scanning an object including a hole, obtaining at least one parameter for recognizing an inner region of the hole from the scan data, and recognizing the inner region of the hole from the scan data based on the obtained at least one parameter.

18 Claims, 13 Drawing Sheets

410
310
310
320
330

410
440
430
420
330
shrink
subdivide
wrap 410
310
310
410
510
410
521
531
310
522
532
540
550
540
510
510
550
540

IMAGE PROCESSING APPARATUS AND IMAGE PROCESSING METHOD

CROSS-REFERENCE TO RELATED APPLICATION

This application is based on and claims priority under 35 U.S.C. § 119 to Korean Patent Application No. 10-2022-0112348, filed on Sep. 5, 2022, in the Korean Intellectual Property Office, the disclosure of which is incorporated by reference herein in its entirety.

BACKGROUND

1. Field

The embodiments relate to an image processing apparatus and an image processing method, and more particularly, to an image processing apparatus and an image processing method for recognizing an inner surface of a hole in a scanned image of an object including the hole.

2. Description of the Related Art

There are cases in which teeth need to be extracted inevitably, such as when teeth are severely damaged by aging, decay, severe tooth decay, or an external impact. When teeth are extracted, if left unattended, surrounding teeth may lie in an empty space or move, which may adversely affect the surrounding teeth. Therefore, in such a case, an implant into a part where a tooth is missing is necessary.

The implant may include a fixture, an abutment, and a crown. The fixture is a structure corresponding to the root of a natural tooth and is inserted into the gum bone. The abutment is an intermediate connecting part that connects the fixture and the crown and rises above the gums. In addition, the crown is a final prosthetic appliance of a tooth model and generally is a part appearing as a tooth.

The abutment has a screw hole for coupling to the fixture. When the crown is designed based on the abutment including the screw hole, the inner surface of the crown may be designed erroneously due to the screw hole. Therefore, in order to design the crown, an image in which the screw hole is filled is required.

SUMMARY

The embodiment provides an image processing method of automatically recognizing an inner region of a hole of an object when an object including the hole is scanned, and an apparatus for performing an operation thereof.

Additional aspects will be set forth in part in the description which follows and, in part, will be apparent from the description, or may be learned by practice of the presented embodiments of the disclosure.

According to an aspect to the disclosure, an image processing method includes obtaining scan data by scanning an object including a hole, obtaining, from the scan data, at least one parameter for recognizing an inner region of the hole, and recognizing the inner region of the hole from the scan data based on the obtained at least one parameter.

The obtaining of the at least one parameter may include obtaining curvature information of vertices included in the scan data.

The obtaining of the curvature information of the vertices may include obtaining a maximum curvature value and a minimum curvature value at each of the vertices.

The recognizing of the inner region of the hole from the scan data based on the obtained at least one parameter may include obtaining first vertices from among the vertices, the first vertices having the maximum curvature value within a predetermined first range and the minimum curvature value within a predetermined second range, and recognizing the inner region of the hole based on the first vertices.

The recognizing of the inner region of the hole based on the first vertices may include grouping the first vertices into a plurality of groups, obtaining first cylinders respectively corresponding to the plurality of groups by performing cylinder fitting by using the first vertices grouped into a same group, obtaining a second cylinder by merging the first cylinders, obtaining, from among the vertices of the scan data, second vertices corresponding to side surfaces of the second cylinder, and recognizing the second vertices as the inner region of the hole.

The grouping of the first vertices into the plurality of groups may include grouping of the first vertices into the plurality of groups by grouping the first vertices with vertices within a predetermined distance into a same group The obtaining of the second vertices corresponding to the side surfaces of the second cylinder among the vertices of the scan data may include obtaining vertices within a predetermined distance from the side surfaces of the second cylinder as the second vertices.

The image processing method may further include displaying the recognized inner region of the hole to be distinguished from other regions.

The object may include an abutment including a screw hole.

The image processing method may further include processing the scan data based on the recognized inner region of the hole.

The processing of the scan data based on the recognized inner region of the hole may include obtaining, based on the recognized inner region of the hole, a final image indicating a form in which the hole is filled.

According to another aspect to the disclosure, an image processing apparatus includes a memory storing one or more instructions, and a processor, wherein the processor is configured to execute the one or more instructions stored in the memory to obtain scan data by scanning an object including a hole, obtain, from the scan data, at least one parameter for recognizing an inner region of the hole, and recognize the inner region of the hole from the scan data based on the obtained at least one parameter.

BRIEF DESCRIPTION OF THE DRAWINGS

The above and other aspects, features, and advantages of certain embodiments of the disclosure will be more apparent from the following description taken in conjunction with the accompanying drawings, in which.

The disclosure may be readily understood from the following detailed description in combination with the accompanying drawings, wherein reference numerals denote structural elements.

DETAILED DESCRIPTION

Figure 1:
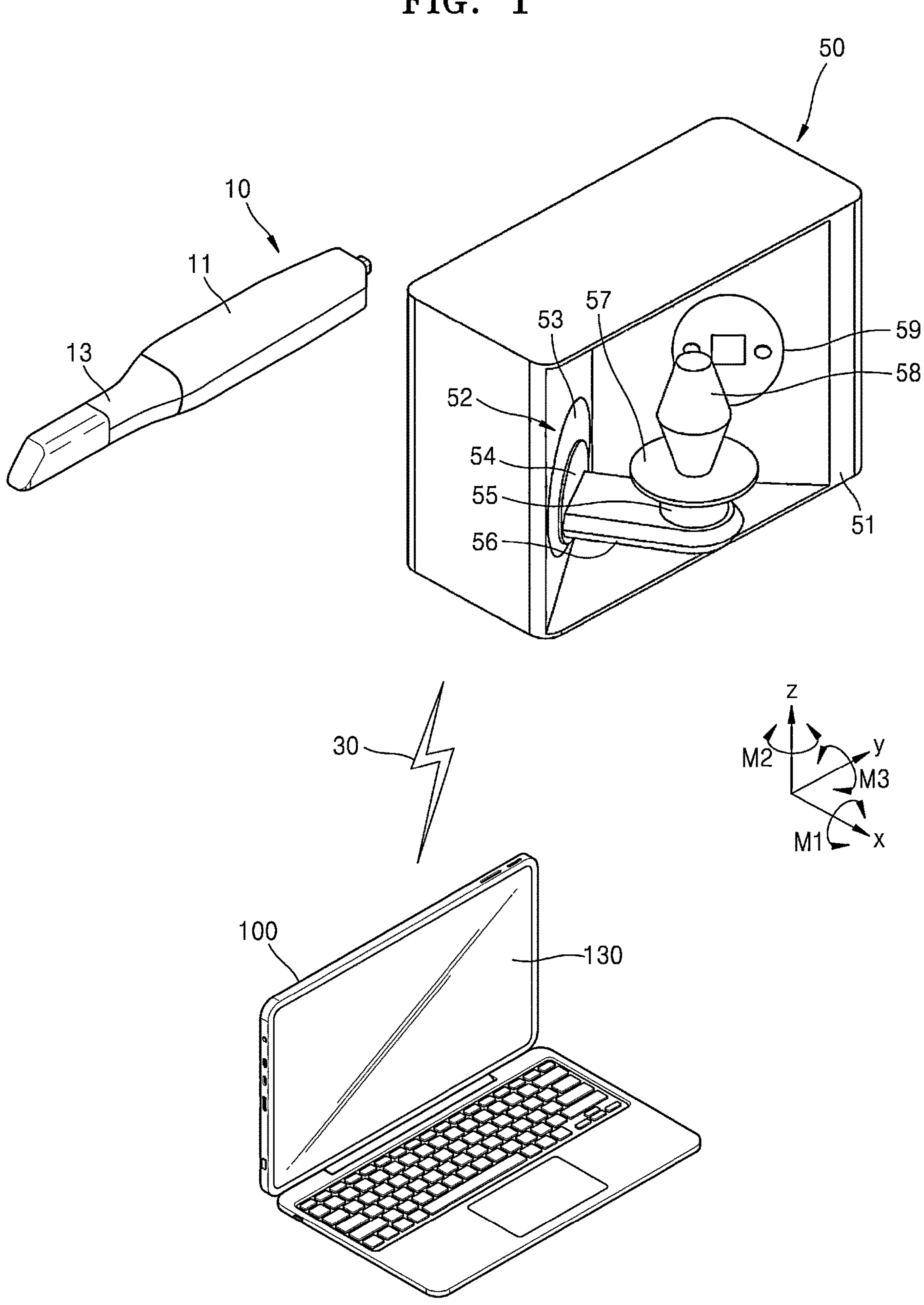
FIG. 1 is a diagram for describing an image processing system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present specification describes the principle of the disclosure and discloses embodiments to clarify the scope of rights of the disclosure and enable one skilled in the art to which the disclosure pertains to work the disclosure. The embodiments may be implemented in various forms.

Throughout the specification, like reference numerals denote like elements. The present specification does not describe all elements of embodiments, and general matters in the technical field to which the disclosure pertains, or redundant descriptions between embodiments, are omitted. Terms such as "part" or "portion" used in the specification may be embodied by software or hardware, and according to embodiments, a plurality of "parts" or "portions" may be embodied as one unit or elements or one "part" or "portion" may include a plurality of units or elements. Hereinafter, the operation principle and embodiments of the disclosure are described with reference to the accompanying drawings.

In the present specification, an image may include an image displaying at least one tooth or oral cavity including at least one tooth.

Furthermore, in the present specification, an image may be a two-dimensional (2D) image of an object or a three-dimensional (3D) model or a 3D image that represents an object in three-dimensions. Furthermore, in the preset specification, an image may mean data needed to express an object in two-dimensions or three-dimensions, for example, raw data obtained from at least one image sensor, etc. In detail, the raw data is data obtained to generate an image, that is, data (e.g., 2D data), obtained by at least one image sensor included in a 3D scanner when an object is scanned by using the 3D scanner.

In the present specification, an "object" may include a tooth, gingiva, at least a partial region of an oral cavity, and/or an artificial structure insertable into the oral cavity (e.g., an orthodontic device, a prosthesis, an implant, an artificial tooth, an orthodontic auxiliary tool inserted into the oral cavity, etc.), a plaster model, an impression model, etc. Here, the orthodontic device may include at least one of a bracket, an attachment, an orthodontic screw, a lingual orthodontic device, and a removable retainer.

Hereinafter, embodiments will be described in detail with reference to accompanying drawings.

FIG. 1 is a diagram for describing an image processing system according to an embodiment.

Referring to FIG. 1, the image processing system may include a 3D scanner 10 and 50, and an image processing apparatus 100. The 3D scanner 10 and 50 and the image processing apparatus 100 may perform communication through a communication network 30.

The 3D scanner 10 and 50, which is a device scanning an object, may be a medical device obtaining an image of the object.

The 3D scanner 10 and 50 may obtain an image of at least one of an oral cavity, an artificial structure, and a plaster model of the oral cavity or artificial structure.

The 3D scanner 10 and 50 may include at least one of an oral scanner 10 and a table scanner 50.

In an embodiment, the 3D scanner 10 and 50 may include the oral scanner 10. The oral scanner 10 may be a handheld type for scanning an oral cavity while a user holds the oral scanner 10 with a hand, and moves the oral scanner 100. The oral scanner 10 may obtain an image of an oral cavity including at least one tooth by being inserted into the oral cavity and scanning the at least one tooth in a non-contact manner. In addition, the oral scanner 10 may have a shape to be capable of being drawn in and out of an oral cavity, and scan the inside of a patient's oral cavity by using at least one image sensor (e.g., an optical camera, etc.)

The oral scanner 10 may include a body 11 and a tip 13. The body 11 may include a light projector (not shown) projecting light, and a camera (not shown) obtaining the image by photographing the object.

The tip 13 is a portion inserted into the oral cavity and may be detachably mounted on the body 11. The tip 13 may include a light path changer to direct the light projected from the body 11 to face the object and direct light received from the object to face the body 11.

The oral scanner 10 may obtain, as raw data, surface information of the object so as to obtain an image of at least one surface from among a tooth, a gum, and an artificial structure (e.g., an orthodontic appliance including a bracket and a wire, an implant, an artificial tooth, or an orthodontic aid inserted into an oral cavity) insertable into the oral cavity.

According to an embodiment, the 3D scanner 10 and 50 may include the table scanner 50. The table scanner 50 may be a scanner obtaining, as raw data, surface information about an object 58 by scanning the object 58 by using rotation of a table 57. The table scanner 50 may scan a surface of the object 58, such as a plaster model or impression model of an oral cavity, an artificial structure insertable into an oral cavity, or a plaster model or impression model of the artificial structure.

The table scanner 50 may include an internal space provided by being dented in an inner direction of a housing 51. The object 58 may be placed in the side surface of the internal space and the internal space may include a moving portion 52 capable of moving the object 58. The moving portion 52 may move in an up-and-down direction in a z-axis direction. The moving portion 52 may include a fixed base 53 connected to a first rotating portion 54, the first rotating portion 54 rotatable in a first rotating direction M1 based on one point on the fixed base 53 as a center axis, for example, an x-axis as the center axis, and a beam portion 56 connected to and protruding from the first rotating portion 54. The beam portion 56 may extend or be shortened in an x-axis direction.

A second rotating portion 115 having a cylindrical shape and rotatable in a second rotating direction M2 using a z-axis as a rotating axis may be connected to the other end of the beam portion 56. The table 57 rotating together with the second rotating portion 55 may be provided on one surface of the second rotating portion 55.

An optical unit 590 may be formed in the internal space. The optical unit 59 may include a light projector (not shown) projecting pattern light to the object 58, and at least one of camera obtaining a plurality of 2D frames by using light reflected from the object 58. The optical unit 59 may further include a second rotating portion (not shown) rotating using the center of the light projector as a rotating axis while being combined to the side surface of the internal space. The second rotating portion may rotate the light projector, a first camera, and a second camera in a third rotating direction M3.

The 3D scanner 10 and 50 may transmit the obtained raw data to the image processing apparatus 100 through the communication network 30. The raw data obtained by the 3D scanner 10 and 50 may be transmitted to the image processing apparatus 100 wirelessly or by wired through the communication network 30.

The image processing apparatus 100 may be connected to the 3D scanner 10 and 50 through the communication network 130 wirelessly or by wired, and may be any electronic device capable of receiving a 2D image obtained by scanning an object from the 3D scanner 10 and 50, and generating, processing, displaying, and/or transmitting an image, based on the received 2D image.

For example, the image processing apparatus 100 may be a computing device, such as a smartphone, a laptop computer, a desktop computer, a personal digital assistant (PDA), or a tablet personal computer (PC), but is not limited thereto. Also, the image processing apparatus 100 may be present in the form of a server (or a server device) for processing the image.

The image processing apparatus 100 may generate information by processing 2D image data received from the 3D scanner 10 and 50 or generate an image by processing the 2D image data. In addition, the image processing apparatus 100 may display the generated information and image through a display 130.

In addition, the 3D scanner 10 and 50 may transmit raw data obtained through scanning, as it is, to the image processing apparatus 100. In this case, the image processing apparatus 100 may generate a 3D oral image that represents oral cavity three dimensionally, based on the received raw data. The image processing apparatus 100 according to an embodiment may generate 3D data (e.g., surface data, mesh data, etc.) representing the shape of a surface of an object three dimensionally, based on the received raw data.

In addition, a "3D image" may also be referred to as a "3D model" because the 3D image may be generated by three-dimensionally modeling an object based on the received raw data. Hereinafter, a model or an image representing an object two-dimensionally or three-dimensionally will be referred to as an "image" as a general term.

In addition, the image processing apparatus 100 may analyze, process, display, and/or externally transmit the generated image.

In another example, the 3D scanner 10 and 50 may obtain raw data through scanning of an object, generate an image corresponding to the object by processing the obtained raw data, and transmit the image to the image processing apparatus 100. In this case, the image processing apparatus 100 may analyze, process, display, and/or transmit the received image.

In the embodiment, the image processing apparatus 100 is an electronic apparatus capable of generating and displaying an image that three-dimensionally represents an object, which is described below in detail.

When receiving the raw data obtained by scanning the object from the 3D scanner 10 and 50, the image processing apparatus 100 according to an embodiment may processes the received raw data to generate a 3D image (or a 3D model). For convenience of description, hereinafter, the 3D image of the object generated by the image processing apparatus 100 is referred to as 'scan data'.

For example, the 3D scanner 10 and 50 may scan an object including a hole. In the embodiment, it is described that the object including the hole is an abutment including a screw hole, but the disclosure is not limited thereto. An abutment is a structure that connects a crown and a fixture included in an implant, and may include a screw hole for coupling with the fixture. The abutment is necessarily scanned after the screw hole formed in the abutment is filled with a filler such as resin. This is described in detail with reference to FIG. 2.

The image processing apparatus 100 according to an embodiment may receive raw data obtained by scanning the abutment from the 3D scanner 10 and 50, and obtain scan data of the abutment based on the received raw data.

Figure 2:
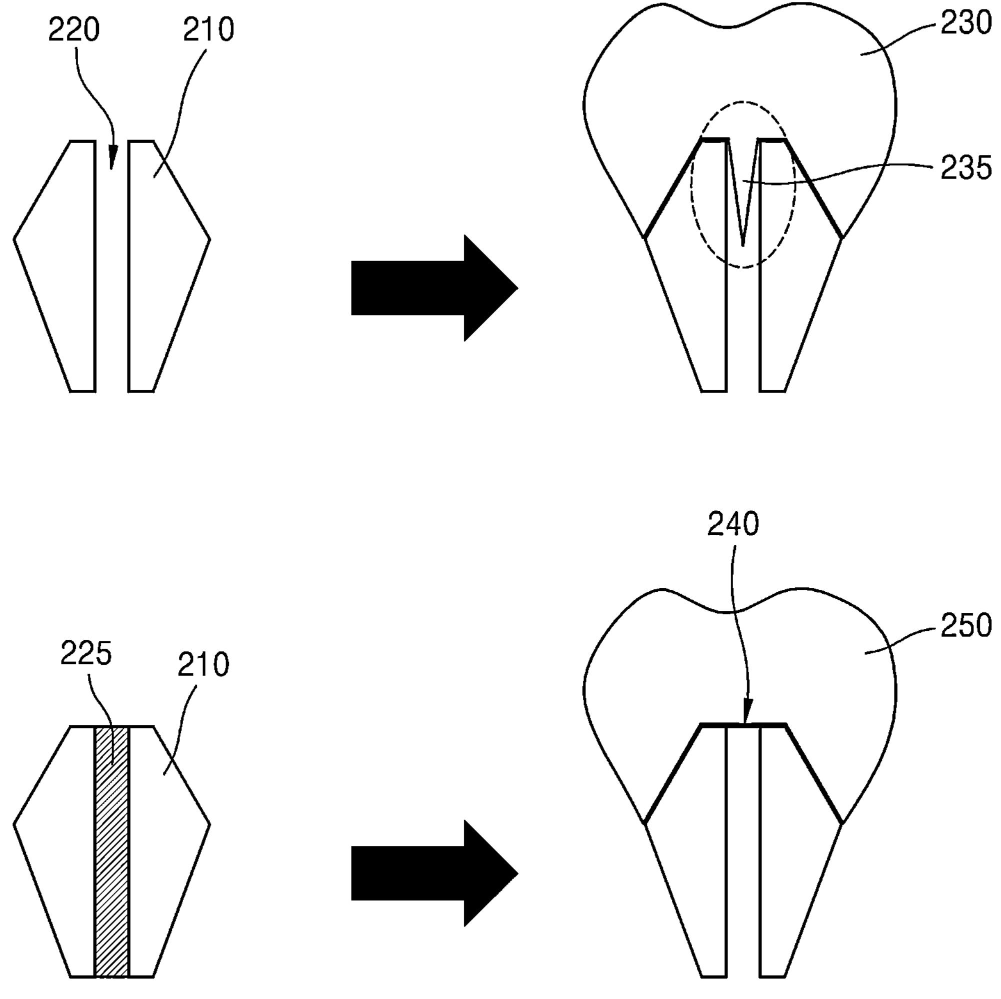
FIG. 2 is a diagram illustrating the reason why a screw hole needs to be filled with a filler when an abutment is scanned according to an embodiment.

FIG. 2 is a diagram illustrating the reason why a screw hole needs to be filled with a filler when an abutment is scanned according to an embodiment.

Referring to FIG. 2, an abutment 210 according to an embodiment may include a screw hole 220. When scan data is obtained by scanning the abutment 210 without filling the screw hole 220, and then, a crown 230 is generated based on the obtained scan data, the crown 230 may be erroneously generated by the screw hole 220 included in the scan data. For example, a lower portion 235 of the crown 230 may be generated by protruding in a direction of the screw hole 220, and the protruding portion may later collide with a screw fixed to a fixture through the screw hole 220.

In order to prevent this, when the screw hole 220 included in the abutment 210 is filled with a filler 225 and flattened, the abutment 210 needs to be scanned while the screw hole 220 is filled with the filler 225. When the abutment 210 is scanned after the screw hole 220 is filled with the filler 225, a screw hole region appears as a flat surface 240 in the scan data, and the crown 250 may be generated along the flat surface.

However, after scanning is completed, the filler 225 filled in the screw hole 220 of the abutment 210 needs to be removed. A process of filling the screw hole 220 with the filler 225 in a flat manner, scanning the abutment 210, and then removing the filler 225 again is not easy, and greatly reduces work efficiency. In addition, there is a problem that the filler 225 is not filled in the screw hole 220 of the abutment 210 installed in an oral cavity.

Accordingly, the image processing apparatus 100 according to an embodiment may generate an image in which the screw hole 220 is filled, based on the scan data obtained by scanning the abutment 210 without filling the screw hole 220 of the abutment 210.

Figure 3:
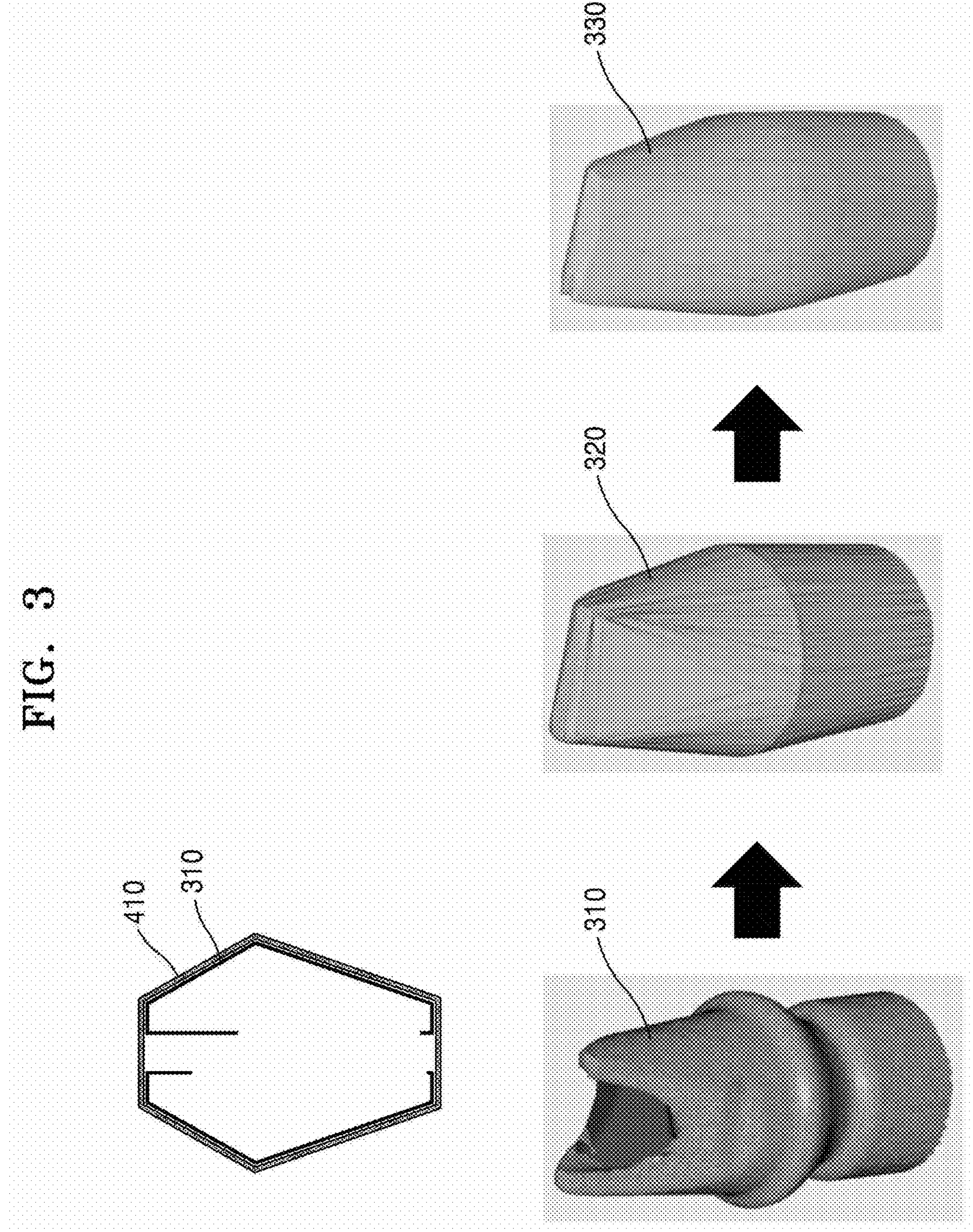
FIGS. 3 and 4 are diagrams illustrating a method, performed by an image processing apparatus, of generating an image in which a hole of an object is filled according to an embodiment.
Figure 4:
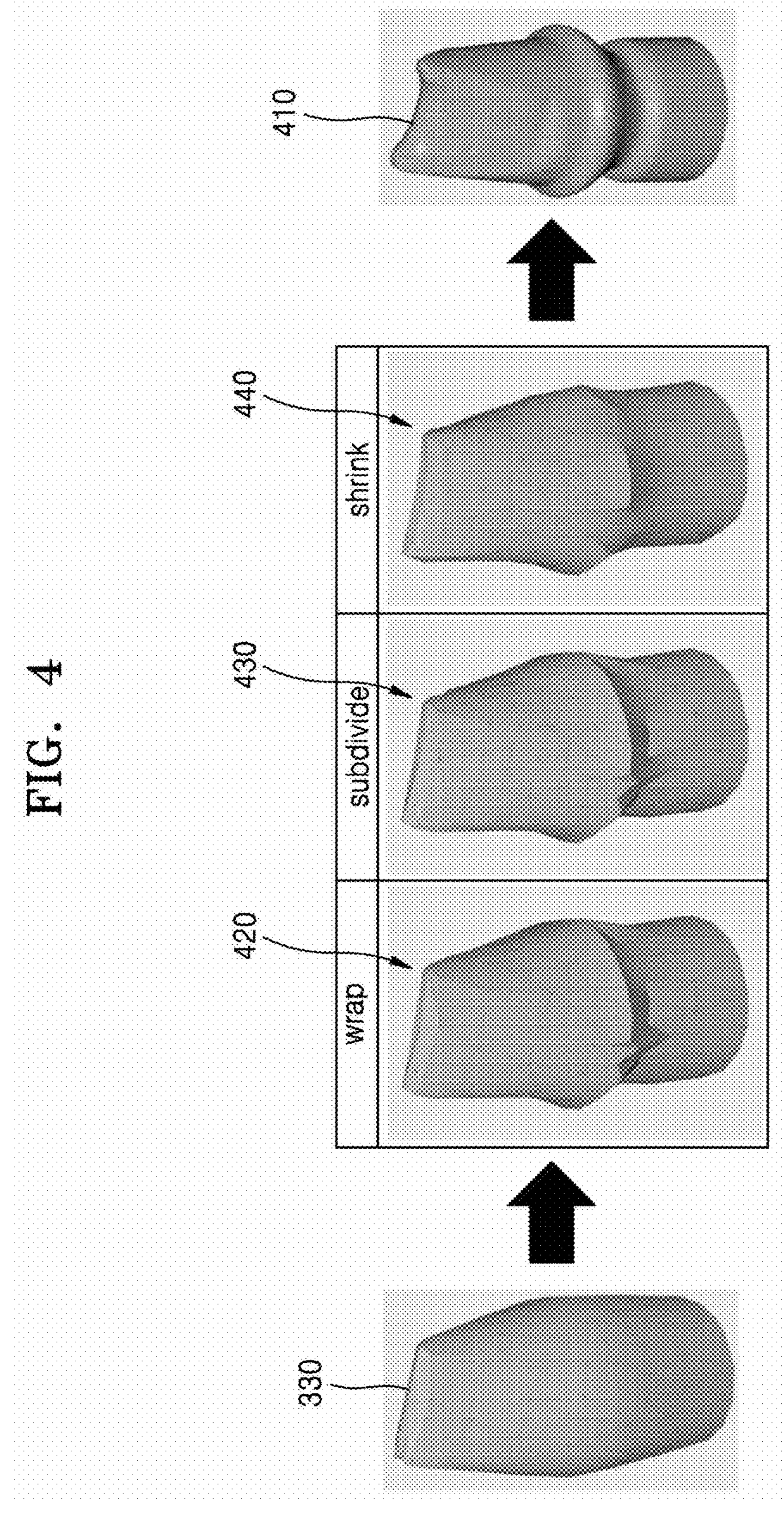

FIGS. 3 and 4 are diagrams illustrating a method, performed by an image processing apparatus, of generating an image in which a hole of an object is filled according to an embodiment.

Referring to FIG. 3, the image processing apparatus 100 according to an embodiment may generate wrapping mesh data 410 based on scan data 310 of an object including a hole.

The image processing apparatus 100 may generate a 3D model 320 surrounding the scan data 310. For example, the image processing apparatus 100 may generate a 3D convex hull of the scan data 310 by using a 3D convex hull algorithm. The 3D convex hull may include convex polygons generated based on some of vertex data included in the scan data 310, but is not limited thereto.

The image processing apparatus 100 may generate initial mesh data 330 including triangles based on the 3D model 320. The triangles included in the initial mesh data 330 may have a more uniform shape than triangles included in the 3D model 320.

Also, referring to FIG. 4, the image processing apparatus 100 may generate the wrapping mesh data 410 based on the initial mesh data 330.

For example, the image processing apparatus 100 may project first meshes (triangles) included in the initial mesh data 330 to meshes (triangles) included in the scan data 310 (hereinafter referred to as 'wrapping' 420). The image processing apparatus 100 may subdivide the projected meshes (hereinafter referred to as 'subdivision' 430). The image processing apparatus 100 may increase the density of the first meshes while maintaining the overall shape of the initial mesh data 330 through a subdivision process.

The image processing apparatus 100 may generate meshes close to the meshes included in the scan data 310 of the object by shrinking the subdivided meshes (hereinafter referred to as 'shrink' 440).

The image processing apparatus 100 may generate the wrapping mesh data 410 by repeating wrapping-subdivision-shrink processes 420, 430, and 440 on the initial mesh data 330. For example, the image processing apparatus 100 may end repetition of the wrapping-subdivision-shrink processes 420, 430, and 440 when a difference between the density of meshes generated by repeating the wrapping-subdivision-shrink processes 420, 430, and 440 and the density of the meshes included in the scan data 310 is less than a predetermined value.

The density of second meshes included in the wrapping mesh data 410 may be greater than the density of the first meshes included in the initial mesh data 330.

Figure 5:
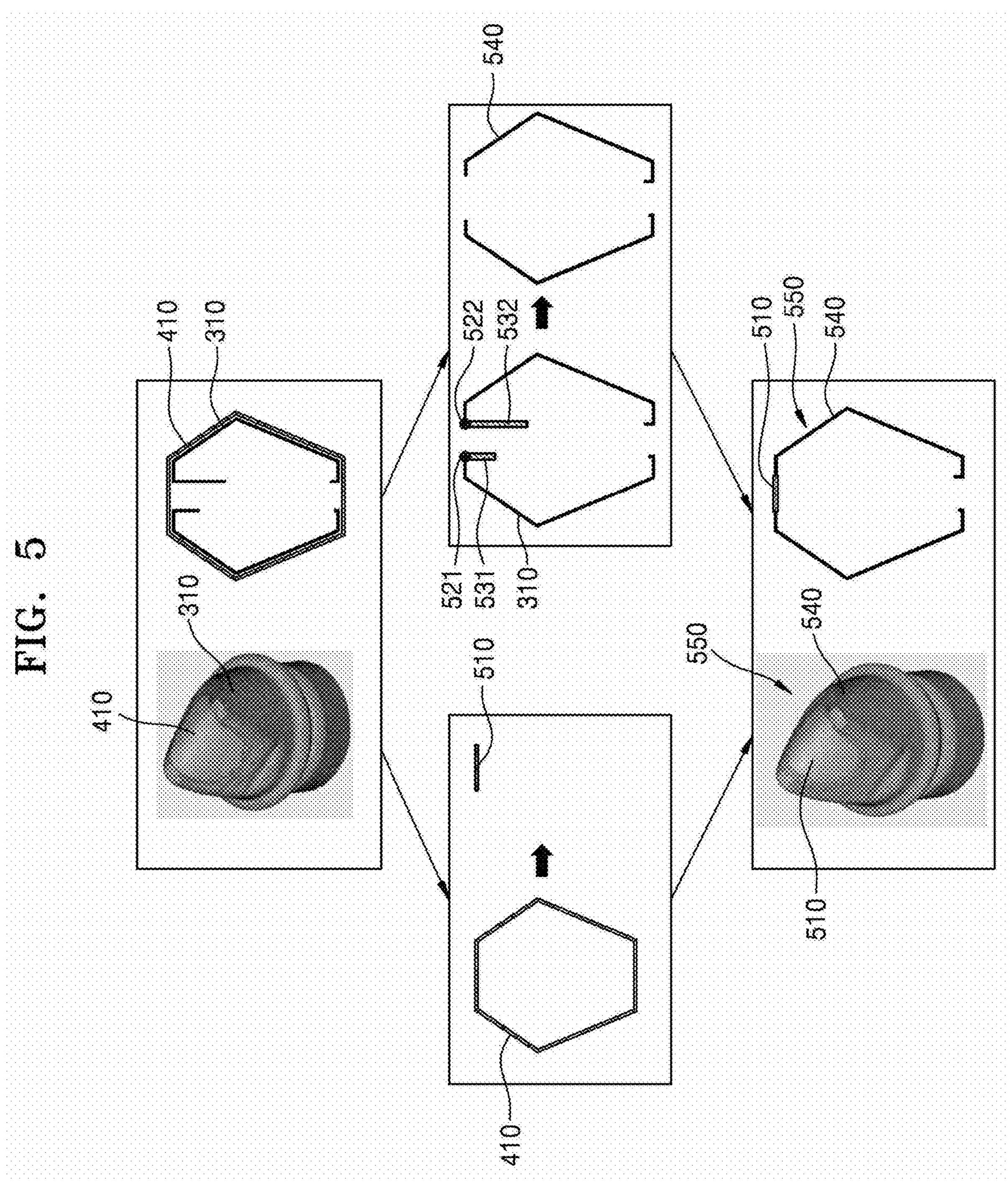
FIG. 5 is a diagram illustrating a method of synthesizing scan data and wrapping mesh data according to an embodiment.

FIG. 5 is a diagram illustrating a method of synthesizing scan data and wrapping mesh data according to an embodiment.

Referring to FIG. 5, the image processing apparatus 100 may align the scan data 310 of an object with the wrapping mesh data 410. In this regard, a known alignment algorithm may be used as a method of aligning the scan data 310 and the wrapping mesh data 410, but is not limited thereto. Alternatively, when the wrapping mesh data 410 is already aligned with the scan data 310, the image processing apparatus 100 may not perform an operation of aligning the wrapping mesh data 410 with the scan data 310.

The image processing apparatus 100 may detect a non-overwrapping region as a hole region of the object while the scan data 310 and the wrapping mesh data 410 are aligned. The image processing apparatus 100 may delete data other than mesh data 510 corresponding to the detected hole region from the wrapping mesh data 410.

In detail, in a state where the scan data 310 and the wrapping mesh data 410 are aligned, the image processing apparatus 100 may generate a first ray in a first direction that is a normal direction from vertices included in the wrapping mesh data 410 and a second ray in a second direction opposite to the first direction and may delete a corresponding vertex when the first ray and the second ray do not intersect within a threshold distance. On the other hand, when the first ray and the second ray do not intersect within the threshold distance, the image processing apparatus 100 may not delete the corresponding vertex. Accordingly, the image processing apparatus 100 may delete data other than the mesh data 510 corresponding to the hole region from the wrapping mesh data 410.

In addition, the image processing apparatus 100 may detect an inner region of a screw hole from the scan data 310 with respect to a boundary of a non-overwrapping region in a state where the scan data 310 and the wrapping mesh data 410 are aligned. For example, as shown in FIG. 5, the image processing apparatus 100 may detect first data 531 and second data 532 as data of the inner region of the screw hole with respect to a first boundary point 521 and a second boundary point 522 of a region of the scan data 310 that does not overlap with the wrapping mesh data 410. The image processing apparatus 100 may delete the data of the inner region of the screw hole from the scan data 310.

Alternatively, the image processing apparatus 100 may first detect the first data 531 and the second data 532 of the inner region of the screw hole from the scan data 310, and detect the boundary of the inner region of the screw hole (e.g., the first boundary point 521 and the second boundary point 522) with respect to the detected inner region of the screw hole. However, the disclosure is not limited thereto.

The image processing apparatus 100 according to an embodiment may generate a final model 550 by synthesizing the mesh data 510 corresponding to the hole region in the wrapping mesh data 410 and the remaining data 540 obtained by deleting the inner region of the screw hole in the scan data 310. The final model 550 may include an image in which the screw hole is filled.

Figure 6:
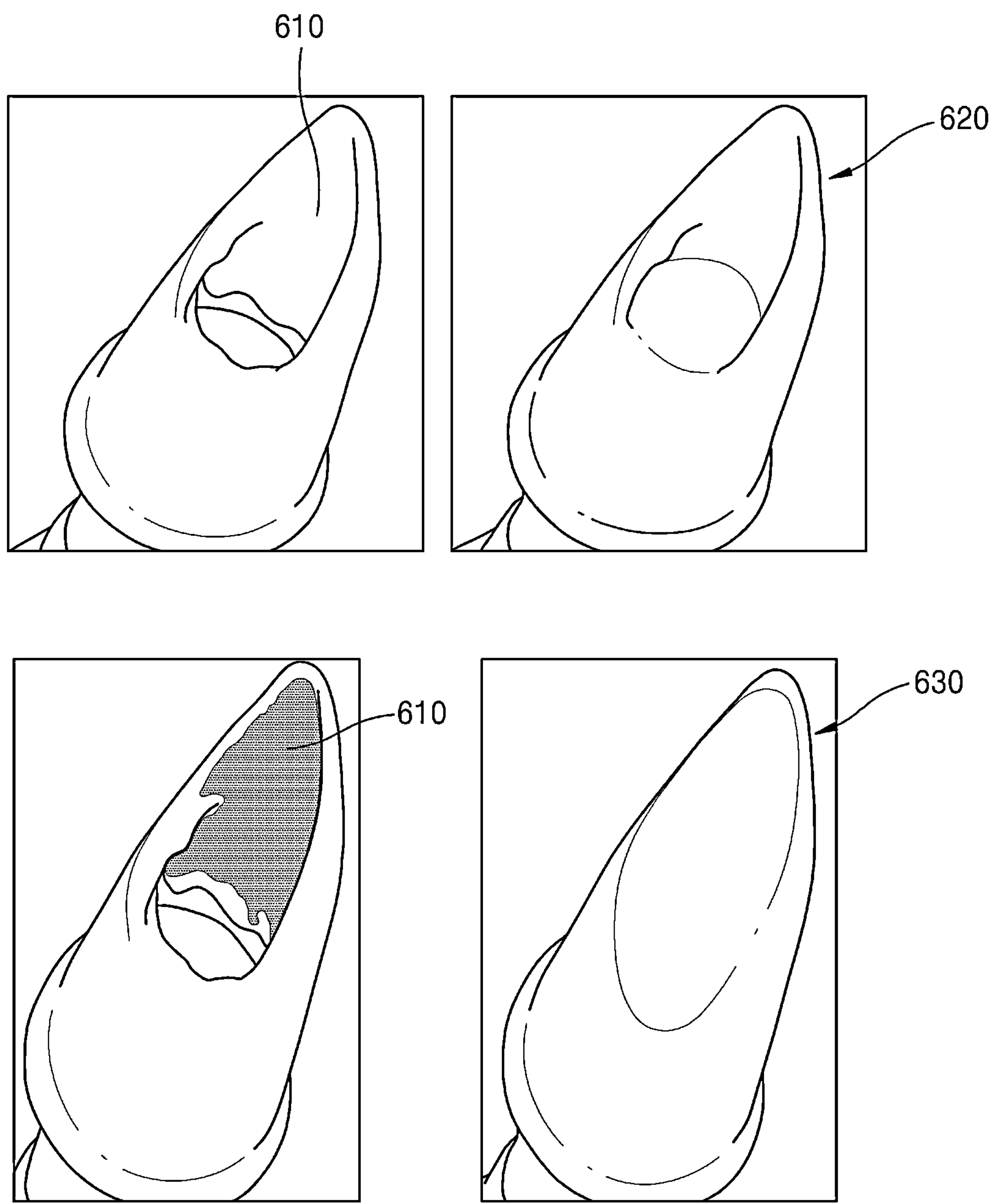
FIG. 6 is a diagram illustrating a method of determining a region to be projected when wrapping mesh data is generated from initial mesh data according to an embodiment.

FIG. 6 is a diagram illustrating a method of determining a region to be projected when wrapping mesh data is generated from initial mesh data according to an embodiment.

Referring to FIG. 6, upon generating the wrapping mesh data from the initial mesh data, when also performing projection on an inner region 610 of a screw hole of scan data, the image processing device 100 according to an embodiment may generate a final model as a first image 620. For example, when the image processing device 100 performs projection on the inner region 610 of the screw hole, the wrapping mesh data includes a mesh surface shape corresponding to the inner region 610 of the screw hole. Accordingly, the wrapping mesh data and the scan data overlap in the inner region 610 of the screw hole, and accordingly, the image processing device 100 may not detect mesh data (e.g., the mesh data 510 of FIG. 5) corresponding to a hole region in the wrapping mesh data. Accordingly, when the scan data and the wrapping mesh data are synthesized, the scan data of the inner region 610 of the screw hole may not be deleted, and the first image 620 may represent a form in which a part of the screw hole is not filled.

On the other hand, upon generating the wrapping mesh data from the initial mesh data, when not performing projection on the inner region 610 of the screw hole, the image processing device 100 according to an embodiment may generate the final model as a second image 630. For example, when not performing projection on the inner region 610 of the screw hole, the wrapping mesh data and scan data do not overlap in the hole region, and the image processing device 100 may detect the mesh data (e.g., the mesh data 510 of FIG. 5) corresponding to the hole region in the wrapping mesh data. When the scan data and the wrapping mesh data are synthesized, the screw hole region of the scan data may be filled by using the mesh data corresponding to the hole region. Accordingly, the second image 630 may represent a form in which the screw hole region is completely filled.

Therefore, when the image processing device 100 according to an embodiment generates the wrapping mesh data from the initial mesh data, it is necessary to recognize the inner region 610 of the screw hole from the scan data in order not to perform projection on the inner region 610 of the screw hole.

A method, performed by the image processing apparatus 100, of recognizing an inner region of a screw hole from scan data according to an embodiment is described in detail with reference to the following drawings.

Figure 7:
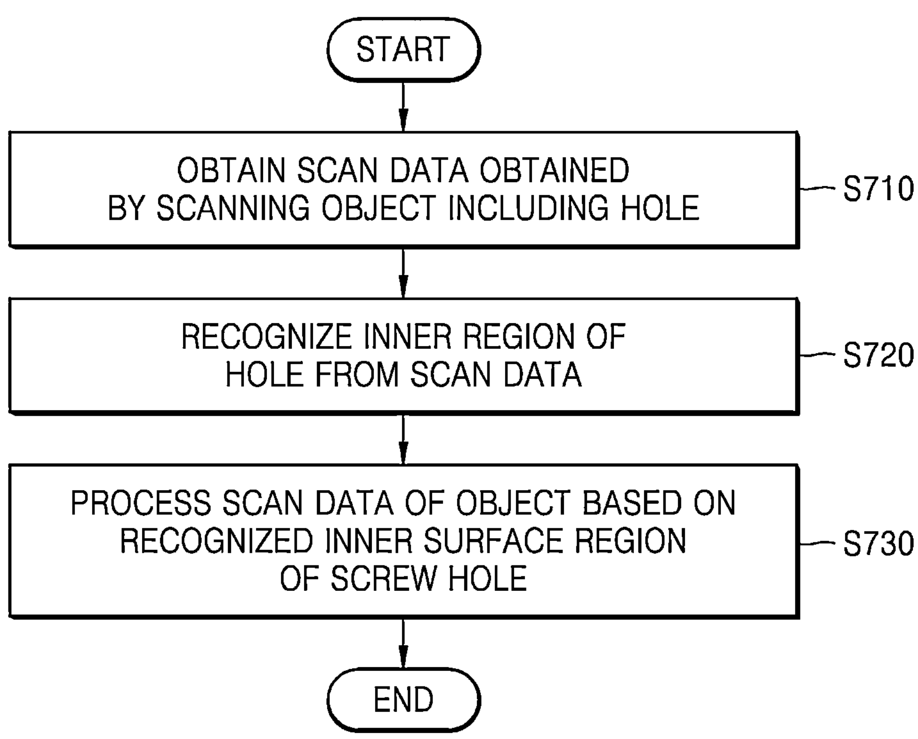
FIG. 7 is a flowchart illustrating an image processing method according to an embodiment.

FIG. 7 is a flowchart illustrating an image processing method according to an embodiment.

The image processing method illustrated in FIG. 7 may be performed by the image processing device 100.

Referring to FIG. 7, the image processing apparatus 100 according to an embodiment may obtain scan data obtained by scanning an object including a hole (S710).

The image processing device 100 may receive raw data obtained by the 3D scanner 10 and 50. For example, the image processing device 100 may obtain the raw data by scanning an abutment fixed to a jig using an adhesive member by using the table scanner 50. Alternatively, the image processing device 100 may obtain the raw data by scanning an abutment installed in an oral cavity by using the oral scanner 10.

The image processing device 100 may generate scan data based on the received raw data. Alternatively, the image processing device 100 may retrieve scan data stored in a memory.

The image processing apparatus 100 may set only the scan data of the abutment as a region of interest in the scan data when data of the adhesive member or the jig other than the abutment is included in the scan data. At this time, the image processing apparatus 100 may set the region of interest based on a user input or automatically detect the scan data of the abutment without a user input, and set the detected scan data of the abutment as the region of interest. However, the disclosure is not limited thereto.

The image processing apparatus 100 according to an embodiment may recognize an inner region of the hole from the scan data (S720).

The image processing apparatus 100 may recognize an inner region of a screw hole based on the fact that the inner region of the screw hole is in the form of a cylinder.

The image processing apparatus 100 may obtain at least one parameter for recognizing the inner region of the hole from the scan data, and recognize the inner region of the hole based on the obtained parameter.

Specifically, the image processing apparatus 100 may obtain curvature information of vertices included in the scan data. The image processing device 100 may obtain a maximum curvature value k1 and a minimum curvature value k2 from each of the vertices. The maximum curvature value k1 may mean the largest absolute value of a curvature value at each of the vertices. Also, the minimum curvature value k2 may mean the smallest absolute value of the curvature value at each of the vertices.

The image processing apparatus 100 may obtain first vertices among the vertices included in the scan data in which the maximum curvature value k1 and the minimum curvature value k2 are within a predetermined range. For example, the image processing apparatus 100 may obtain the first vertices having the maximum curvature value k1 in a first range and the minimum curvature value k2 in a second range.

In this regard, the maximum curvature value k1 may be a curvature value representing the largest curvature value in a (−) direction. For example, the curvature value is calculated as 1/r, where r denotes a radius of curvature. A vertex included in the inner region of the screw hole in the form of the cylinder is located on a concave curve or a concave curved surface, and thus, a sign of the curvature value may be determined as (−). In addition, assuming that a radius of the screw hole is 1 mm to 2 mm, the first range of the maximum curvature value k1 may be determined to be −1 or more and −0.5 or less. However, the disclosure is not limited thereto, and based on the form or radius of the screw hole, the first range of the maximum curvature value k1 may be differently determined.

In addition, the vertex included in the inner region of the screw hole in the form of the cylinder may have a value close to 0 as the minimum curvature value k2. The second range of the minimum curvature value k2 may be determined to be −0.25 or more and +0.25 or less. However, the disclosure is not limited thereto, and based on the form or radius of the screw hole, the second range of the minimum curvature value k2 may be differently determined.

The image processing apparatus 100 according to an embodiment may group the obtained first vertices with adjacent vertices. For example, the image processing apparatus 100 may group vertices within a predetermined distance into the same group. Also, the image processing apparatus 100 may perform cylinder fitting for each group.

For example, when grouping the first vertices into first to third groups, the image processing apparatus 100 may obtain a first cylinder corresponding to the first vertices included in the first group, obtain a second cylinder corresponding to the first vertices included in the second group, and obtain a third cylinder corresponding to the first vertices included in the third group. At this time, the first to third cylinders may be assumed to be finite cylinders of ranges limited in a height direction.

The image processing apparatus 100 may determine whether cylinders respectively corresponding to a plurality of groups may be merged. For example, the image processing apparatus 100 may determine whether the first cylinder and the second cylinder may be merged by considering whether a distance between a central axis of the first cylinder and a central axis of the second cylinder is within a predetermined distance, whether a point where the central axis of the first cylinder and the central axis of the second cylinder intersect is a point within the first cylinder or the second cylinder, or whether a region in which the first cylinder and the second cylinder overlap is greater than or equal to a predetermined volume.

Accordingly, the image processing device 100 may determine that the first to third cylinders may be merged. The image processing device 100 may obtain a fourth cylinder by merging the first to third cylinders.

The image processing apparatus 100 may obtain second vertices corresponding to side surfaces of the fourth cylinder among the vertices included in the scan data. For example, the image processing apparatus 100 may obtain, as the second vertices, vertices that are within a predetermined distance from the side surfaces of the fourth cylinder among the vertices included in the scan data.

The image processing apparatus 100 may determine the second vertices as vertices included in the inner region of the screw hole.

The image processing apparatus 100 according to an embodiment may process scan data of an object based on the recognized inner surface region of the screw hole (S730).

For example, as described with reference to FIGS. 3 to 5, the image processing apparatus 100 may not perform projection on the recognized inner surface region of the screw hole when generating wrapping mesh data, in order to obtain a final image in the form in which the hole of the object is filled. Accordingly, the image processing device 100 may obtain the final image in the form in which the screw hole region is completely filled, as shown in the second image 630 of FIG. 6. However, the disclosure is not limited thereto, and the image processing device 100 may perform image processing in various ways based on the recognized inner surface region of the screw hole.

Figure 8:
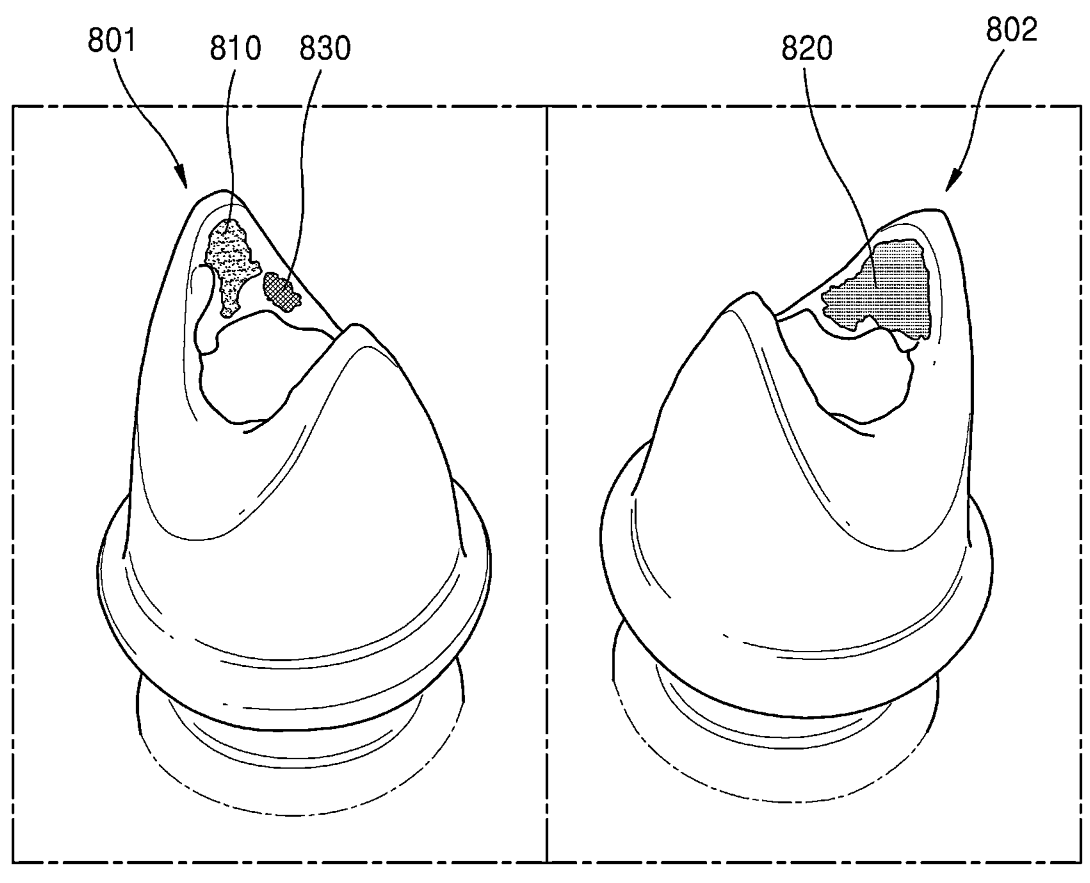
FIGS. 8 to 10 are diagrams referenced for describing a method, performed by an image processing apparatus, of recognizing an inner region of a hole of an object according to an embodiment.
Figure 9A:
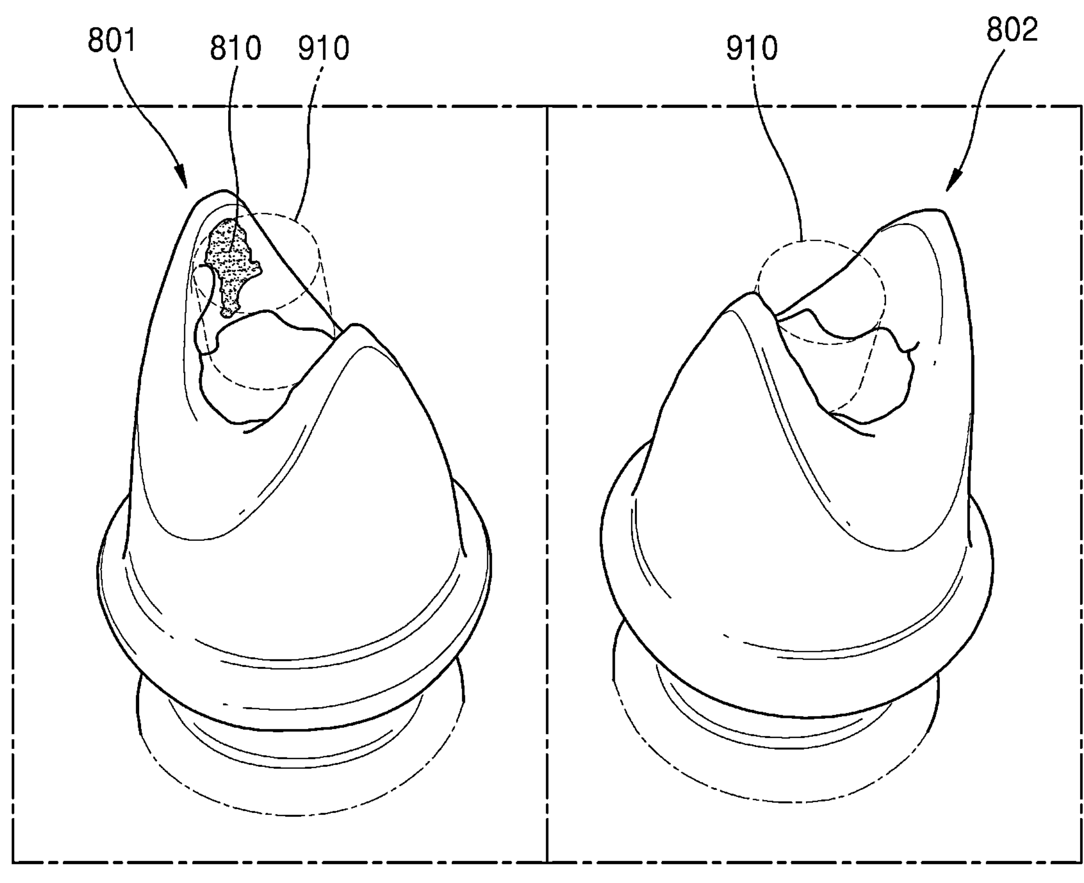
Figure 9B:
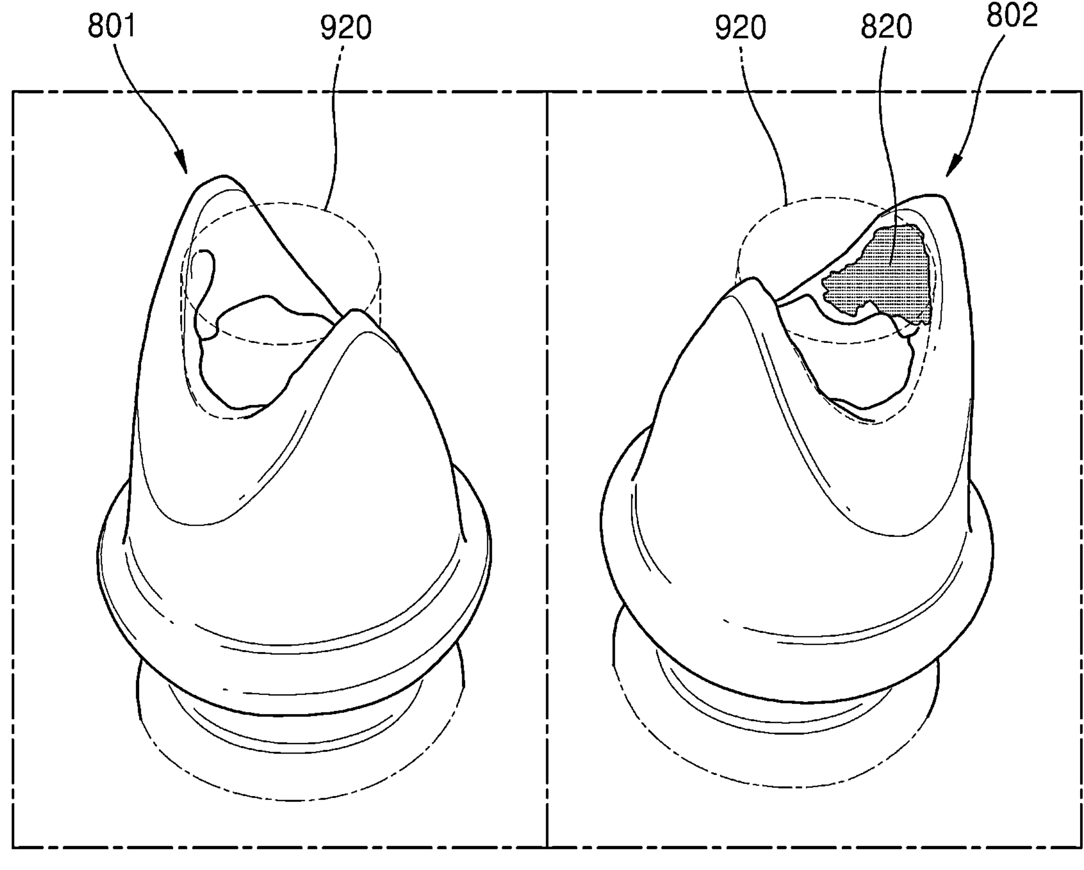
Figure 9C:
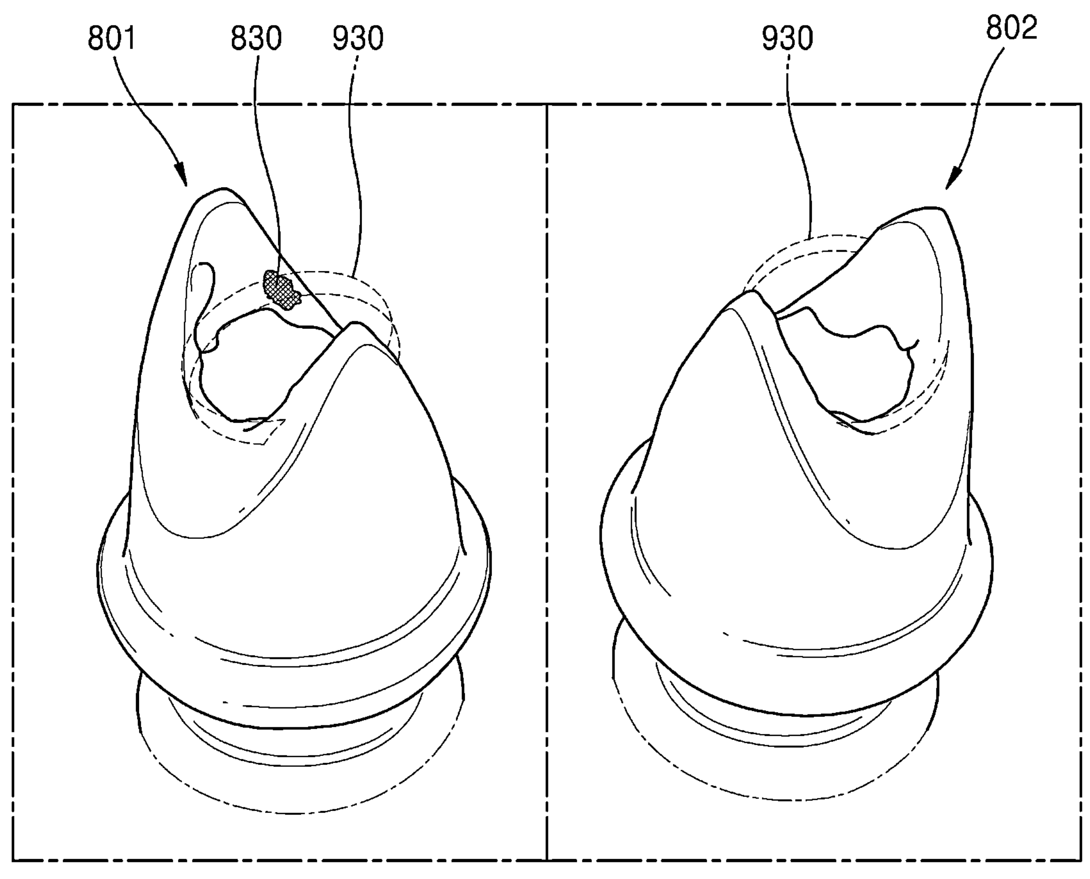
Figure 10:
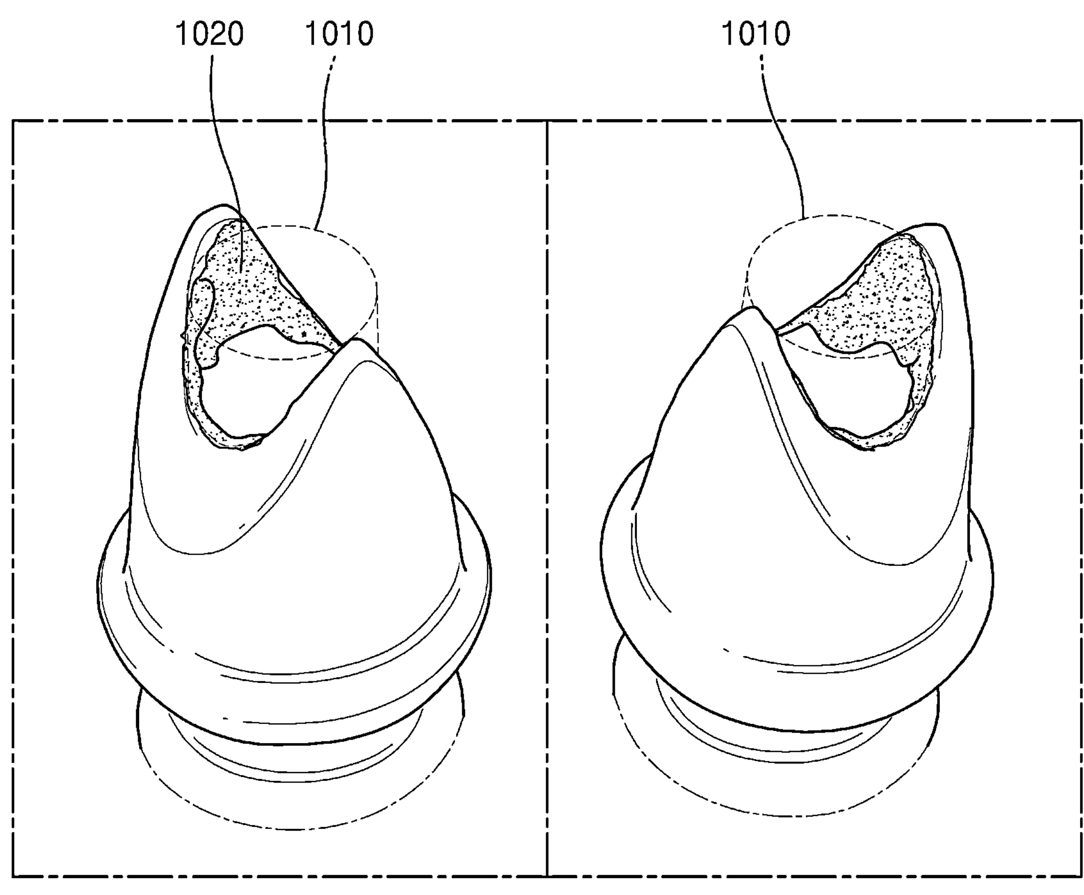

FIGS. 8 to 10 are diagrams referenced for describing a method, performed by an image processing apparatus, of recognizing an inner region of a hole of an object according to an embodiment.

First scan data 801 of FIG. 8 indicates that scan data of the object including the hole is displayed in a first direction, and second scan data 802 indicates that the scan data of the object including the hole is displayed in a second direction.

The image processing device 100 according to an embodiment may obtain curvature information of vertices included in the scan data. The image processing device 100 may obtain a minimum curvature value and a maximum curvature value at each of the vertices.

The image processing apparatus 100 may determine whether each of the vertices has curvature information of a cylinder based on the obtained minimum curvature value and maximum curvature value of each of the vertices. For example, a vertex included in an inner surface of the cylinder has the maximum curvature value of $-1/r$. In this regard, r denotes a radius of the cylinder, and the inner surface of the cylinder is a concave surface, and thus, a sign of the curvature value may be determined as (−). In addition, the vertex included in the inner surface of the cylinder has the minimum curvature value of 0.

An inner region of a screw hole is usually in the form of a cylinder, and thus, the image processing apparatus 100 may obtain first vertices 810 among the vertices included in the scan data, based on the curvature information of the cylinder. The image processing apparatus 100 may obtain first vertices 810, 820, and 830 each having a maximum curvature value in a first range and a minimum curvature value in a second range among the vertices. For example, when the object is an abutment including a screw hole having a radius of 1 mm to 2 mm, the first range of the maximum curvature value may be −1 or more −0.5 or less, and the second range of the minimum curvature value may be −0.25 or more and +0.25. However, the above numerical values are only examples, and other values may be determined according to an embodiment. The image processing apparatus 100 according to an embodiment may group the first vertices 810, 820, and 830 with adjacent vertices. For example, the image processing apparatus 100 may group the first vertices 810, 820, and 830 into the same group with vertices within a predetermined distance such as the first group 810, the second group 820, and the third group 830.

Referring to FIGS. 9A to 9C, the image processing apparatus 100 according to an embodiment may perform cylinder fitting for each group.

Referring to FIG. 9A, the image processing apparatus 100 may obtain a first cylinder 910 corresponding to the first group 810 by performing cylinder fitting based on the vertices included in the first group 810. For example, the image processing apparatus 100 may calculate a side surface (curved surface) of a cylinder that most closely matches the vertices included in the first group 810. The image processing device 100 may obtain the first cylinder 910 having the calculated side surface.

Also, referring to FIG. 9B, the image processing apparatus 100 may obtain a second cylinder 920 corresponding to the second group 820 by performing cylinder fitting based on the vertices included in the second group 820. For example, the image processing apparatus 100 may calculate a side surface of a cylinder that most closely matches the vertices included in the second group 820. The image processing device 100 may obtain the second cylinder 920 having the calculated side surface.

Also, referring to FIG. 9C, the image processing apparatus 100 may obtain a third cylinder 930 corresponding to the third group 830 by performing cylinder fitting based on the vertices included in the third group 830. For example, the image processing apparatus 100 may calculate a side surface of a cylinder that most closely matches the vertices included in the third group 830. The image processing device 100 may obtain the third cylinder 930 having the calculated side surface.

In this regard, the first to third cylinders 910, 920, and 930 may be cylinders each having a finite range in a height direction.

Referring to FIG. 10, the image processing apparatus 100 according to an embodiment may merge obtained cylinders into one cylinder by perform cylinder fitting for each group.

For example, the image processing apparatus 100 may obtain a fourth cylinder 1010 including the first cylinder 910, the second cylinder 920, and the third cylinder 930.

The image processing device 100 may obtain second vertices 1020 corresponding to side surfaces of the fourth cylinder 1010 among vertices included in the scan data. For example, the image processing apparatus 100 may determine vertices existing within a predetermined distance from the side surfaces of the fourth cylinder 1010 as the second vertices 1020 among the vertices included in the scan data.

The image processing apparatus 100 according to an embodiment may recognize a region including the second vertices 1020 as an inner region of a screw hole.

The image processing device 100 may display the recognized inner surface region of the screw hole to be distinguished from other regions. For example, the image processing device 100 may display the second vertices 1020 included in the inner surface region of the screw hole in a different color from other vertices included in the scan data. However, the disclosure is not limited thereto.

Figure 11:
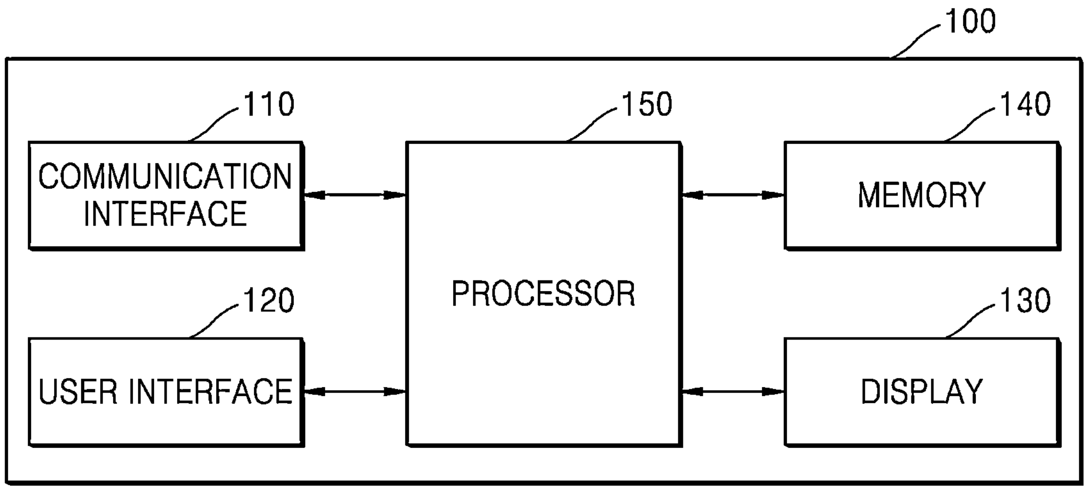
FIG. 11 is a block diagram illustrating an image processing apparatus according to an embodiment.

FIG. 11 is a block diagram of an image processing apparatus according to an embodiment.

The image processing method of FIG. 7 may be performed by the image processing apparatus 100. Therefore, the image processing method of FIG. 7 may be a flowchart illustrating operations of the image processing apparatus 100.

Referring to FIG. 11, the image processing apparatus 100 may include a communication interface 110, a user interface 120, the display 130, a memory 140, and a processor 150.

The communication interface 110 may perform communication with at least one external electronic apparatus (e.g., the oral scanner 10), a server, an external medical apparatus, etc.) through a wired or wireless communication network. The communication interface 110 may perform communication with the at least one external electronic apparatus under the control of the processor 150.

In detail, the communication interface 110 may include at least one short-range communication module that performs communication according to communication standards, such as Bluetooth, Wi-Fi, Bluetooth low energy (BLE), NFC/RFID, Wi-Fi Direct, UWB, ZIGBEE, etc.

In addition, the communication interface 110 may further include a long-range communication module that performs communication with a server for supporting a long-range communication according to long-range communication standards. In detail, the communication interface 110 may further include the long-range communication module that performs communication through a network for the Internet communication. In addition, the communication interface 110 may include a long-range communication module that performs communication through a communication network according to the communication standard, such as third generation (3G), fourth generation (4G), and/or fifth generation (5G).

In addition, the communication interface 110 may include at least one port to be connected to an external electronic apparatus by a wired cable, to communicate with the external electronic apparatus (e.g., an oral scanner, etc.) by wired. Accordingly, the communication interface 110 may perform communication with the external electronic apparatus that is connected by wired through the at least one port.

The user interface 120 may receive a user input to control the image processing apparatus 100. The user interface 120 may include a user input device including a touch panel for sensing a touch by a user, a button for receiving a push manipulation by the user, a mouse or a keyboard for assigning or selecting a point on a user interface screen, etc., but the disclosure is not limited thereto.

In addition, the user interface 120 may include a voice recognition apparatus for voice recognition. For example, the voice recognition apparatus may be a microphone, and the voice recognition apparatus may receive a voice command or a voice request by a user. Accordingly, the processor 150 may control the voice recognition apparatus to perform an operation corresponding the voice command or the voice request.

The user interface 120 according to an embodiment may receive a user input for recognizing an inner region of a screw hole.

The display 130 displays a screen. In detail, the display 130 may display a certain screen under the control of the processor 150. In detail, the display 130 may display a user interface screen including an oral image generated based on data obtained by scanning patient's oral cavity by using the oral scanner 10. Alternatively, the display 130 may display a user interface screen including an image of an object generated based on data obtained from the table scanner 50.

Alternatively, the display 130 may display a user interface screen including information related to patient's dental treatment.

The display 130 according to an embodiment may display the inner region of the screw hole recognized from scan data of the object to be distinguished from other regions.

The memory 140 may store at least one instruction. In addition, the memory 140 may store at least one instruction to be executed by the processor 150. In addition, the memory 140 may store at least one program to be executed by the processor 120. In addition, the memory 140 may store data received from the 3D scanner 10 and 50 (e.g., raw data obtained through scanning, etc.) Alternatively, the memory 140 may store an image that represents an object three-dimensionally. The memory 140 according to an embodiment may include one or more instructions for automatically setting a region of interest corresponding to an object of interest from an image of an object including the object of interest. The memory 140 according to an embodiment may include one or more instructions for performing a method disclosed in the disclosure to automatically set the region of interest corresponding to the object of interest from the image of an object including the object of interest.

The processor 150 may control an intended operation to be performed by executing at least one instruction stored in the memory 140. The at least one instruction may be stored in an internal memory included in the processor 150 or the memory 140 included in the image processing apparatus 100 separately from the processor 150.

In detail, the processor 150 may control at least one component included in the image processing apparatus 100 so that the intended operation is performed by executing the at least one instruction. Accordingly, even when it is described that the processor 150 performs certain operations, the processor 150 may control the at least one of components included in the image processing apparatus 100 so that the certain operations are performed.

According to an embodiment the processor 150 may generate scan data based on the raw data received from the 3D scanner 10 and 50, by executing the one or more instructions stored in the memory 140. At this time, the raw data may include raw data obtained by scanning an object including an abutment (e.g., a model with the abutment attached to a jig, etc., an oral cavity with the abutment installed, etc.) by the 3D scanner 10 and 50.

The processor 150 may recognize an inner region of a hole from the scan data by executing the one or more instructions stored in the memory 140. For example, the processor 150 may recognize an inner region of a screw hole based on the fact that the inner region of the screw hole is in the form of a cylinder.

The processor 150 may obtain curvature information of vertices included in the scan data. The processor 150 may obtain the minimum curvature value k1 and the maximum curvature value k2 from each of the vertices. The processor 150 may obtain vertices having curvature information of the cylinder from the vertices included in the scan data based on the obtained curvature information. The processor 150 may obtain first vertices among the vertices included in the scan data in which the maximum curvature value k1 and the minimum curvature value k2 are within a predetermined range. For example, the processor 150 may obtain the first vertices having the maximum curvature value k1 in a first range and the minimum curvature value k2 in a second range.

In this regard, the maximum curvature value k1 may be a curvature value representing the largest curvature value in a (−) direction. For example, the curvature value is calculated as 1/r, where r denotes a radius of curvature. A vertex included in the inner region of the screw hole in the form of the cylinder is located on a concave curve or a concave curved surface, and thus, a sign of the curvature value may be determined as (−). In addition, assuming that a radius of the screw hole is 1 mm to 2 mm, the first range of the maximum curvature value k1 may be determined to be −1 or more and −0.5 or less. However, the disclosure is not limited thereto, and based on the form or radius of the screw hole, the first range of the maximum curvature value k1 may be differently determined.

In addition, the vertex included in the inner region of the screw hole in the form of the cylinder may have a value close to 0 as the minimum curvature value k2. The second range of the minimum curvature value k2 may be determined to be −0.25 or more and +0.25 or less. However, the disclosure is not limited thereto, and based on the form or radius of the screw hole, the second range of the minimum curvature value k2 may be differently determined.

The processor 150 according to an embodiment may group the obtained first vertices with adjacent vertices. For example, the processor 150 may group vertices within a predetermined distance into the same group Also, the processor 150 may perform cylinder fitting for each group. For example, when grouping the first vertices into first to third groups, the processor 150 may obtain a first cylinder corresponding to the first vertices included in the first group, obtain a second cylinder corresponding to the first vertices included in the second group, and obtain a third cylinder corresponding to the first vertices included in the third group. At this time, the first to third cylinders may be assumed to be finite cylinders of ranges limited in a height direction.

The processor 150 may obtain a fourth cylinder by merging the first to third cylinders.

The processor 150 may obtain second vertices corresponding to side surfaces of the fourth cylinder among the vertices included in the scan data. For example, the processor 150 may obtain, as the second vertices, vertices that are within a predetermined distance from the side surfaces of the fourth cylinder among the vertices included in the scan data.

The processor 150 may determine the second vertices as vertices included in the inner region of the screw hole.

The processor 150 may process scan data of an object based on the recognized inner surface region of the screw hole by executing the one or more instructions stored in the memory 140. For example, the processor 150 may not perform projection on the recognized inner surface region of the screw hole when generating wrapping mesh data, in order to obtain a final image in the form in which the hole of the object is filled.

Also, the processor 150 may control the display 130 to display the recognized inner region of the screw hole to be distinguished from other regions.

The processor 150 according to an embodiment may be implemented in the form including internally at least one internal processor and a memory device (e.g., RAM, ROM, etc.) storing at least one of a program, an instruction, a signal, data, etc. to be used or processed by the internal processor.

In addition, the processor 150 may include a graphics processing unit (GPU) for graphics process corresponding to video. In addition, the processor 150 may be implemented as a system-on-chip (SoC) incorporating a core and the GPU. In addition, the processor 150 may include a multi core more than a single core. For example, the processor 150 may include a dual core, a triple core, a quad core, a hexa core, an octa core, a deca core, a dodeca core, a hexadeca core, etc.

In the embodiment, the processor 150 may generate an image, based on the 2D image received from the 3D scanner 10 and 50.

In detail, under the control of the processor 150, the communication interface 110 may receive the data obtained by the 3D scanner 10 and 50, for example, raw data obtained through scanning. Then, the processor 120 may generate a 3D image that represents an object three-dimensionally, based on the raw data received from the communication interface 110. For example, the 3D scanner 10 and 50 may include an L camera corresponding to the left field of view and an R camera corresponding to the right field of view, to reconstruct a 3D image according to an optical triangulation method. The 3D scanner 10 and 50 may obtain L image data corresponding to the left field of view and R image data corresponding to the right field of view, respectively, from the L camera and the R camera. Subsequently, the 3D scanner 10 and 50 may transmit raw data including the L image data and the R image data to the communication interface 110 of the image processing apparatus 100.

Then, the communication interface 110 may transfer the received raw data to the processor 150, and the processor 150 may generate the image that represents the object three-dimensionally, based on the received raw data.

In addition, the processor 150 may receive the image that represents the object three-dimensionally directly from an external server, a medical apparatus, etc., by controlling the communication interface 110. In this case, the processor 150 may obtain a 3D image, without generating a 3D image based on the raw data.

According to the disclosed embodiment, the performing of operations such as "extraction," "obtaining," "generating," and the like, by the processor 150, may include not only directly performing the above-described operations by executing at least one instruction in the processor 150, but also controlling other elements to perform the above-described operations.

In order to implement the embodiments disclosed in the specification, the image processing apparatus 100 may include only some of the elements illustrated in FIG. 11, or more elements other than the elements illustrated in FIG. 11.

In addition the image processing apparatus 100 may store and execute dedicated software in conjunction with the 3D scanner 10 and 50. The dedicated software may be referred to as a dedicated program, a dedicated tool, or a dedicated application. When the image processing apparatus 100 operates in conjunction with the 3D scanner 10 and 50, the dedicated software stored in the image processing apparatus 100 may be connected to the 3D scanner 10 and 50 to receive, in real time, data obtained through scanning of an object. For example, dedicated software for processing data obtained through scanning of an object exists for a product "i500" that is a 3D scanner by Medit. In detail, Medit manufactures and distributes "Medit Link" that is software for processing, managing, using, and/or transmitting data obtained by the 3D scanner, for example, i500. The "dedicated software" means a program, a tool, or an application capable of operating in conjunction with the 3D scanner, and various 3D scanners that are developed and sold by various manufacturers may be commonly used. In addition, the above-described dedicated software may be manufactured and distributed separate from the 3D scanner that performs scanning of an object.

The image processing apparatus 100 may store and execute dedicated software corresponding to the product i500. The dedicated software may perform at least one of operations to obtain, process, store, and/or transmit an image. The dedicated software may be stored in the processor 150. In addition, the dedicated software may provide a user interface for use of data obtained from the 3D scanner.

A user interface screen provided by the dedicated software may include an image generated according to the embodiment.

The image processing method according to an embodiment may be recorded on a computer-readable recording medium by being implemented in a form of program commands executed by using various computers. Also, an embodiment of the disclosure may include a computer-readable storage medium having recorded thereon at least one program including at least one instruction for executing the image processing method.

The computer-readable recording medium may include at least one of a program command, a data file, or a data structure. Examples of the computer-readable recording medium include magnetic media such as hard disks, floppy disks, and magnetic tapes, optical media such as CD-ROMs and DVDs, magneto-optical media such as floptical disks, and hardware devices configured to store and perform program commands, such as read-only memory (ROM), random-access memory (RAM), and flash memory.

A machine-readable storage medium may be provided in the form of a non-transitory storage medium. The "non-transitory storage medium" may denote that a storage medium is a tangible device. The "non-transitory storage medium" may include a buffer where data is temporarily stored.

According to an embodiment, a data processing method according to various embodiments in the present specification may be provided by being included in a computer program product. The computer program product may be distributed in the form of the machine-readable storage medium (e.g., a compact disc read-only memory (CD-ROM). Alternatively, the computer program product may be distributed (e.g., downloaded or uploaded) directly or online through an application store (e.g., PlayStore™) or between two user devices (e.g., smartphones). In detail, the computer program product according to an embodiment may include a storage medium having recorded thereon a program including at least one instruction for executing the image processing method according to an embodiment.

An image processing apparatus and an image processing method according to an embodiment may automatically recognize an inner region of a hole from scan data or a scan image of an object including a hole.

The image processing apparatus and image processing method may obtain a final image by processing the scan data based on the recognized inner region of the hole. Accordingly, the image processing apparatus and the image processing method may obtain a final image in the form in which the hole is completely filled.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An image processing method comprising:

obtaining scan data by scanning an object including a hole, wherein the scan data includes a portion of an inner region of the hole;

obtaining, from the scan data, at least one parameter for recognizing the inner region of the hole;

recognizing the inner region of the hole from the scan data based on the obtained at least one parameter;

deleting the inner region of the hole in the scan data; and obtaining, based on the scan data from which the inner region of the hole has been deleted, a final image indicating a form in which the hole is filled with a filler, wherein the object includes an abutment including a screw hole.

2. The image processing method of claim 1, wherein the obtaining of the at least one parameter includes obtaining curvature information of vertices included in the scan data.

3. The image processing method of claim 2, wherein the obtaining of the curvature information of the vertices includes obtaining a maximum curvature value and a minimum curvature value at each of the vertices.

4. The image processing method of claim 3, wherein the recognizing of the inner region of the hole from the scan data based on the obtained at least one parameter includes obtaining first vertices from among the vertices, the first vertices having the maximum curvature value within a predetermined first range and the minimum curvature value within a predetermined second range; and recognizing the inner region of the hole based on the first vertices.

5. The image processing method of claim 4, wherein the recognizing of the inner region of the hole based on the first vertices includes grouping the first vertices into a plurality of groups;

obtaining first cylinders respectively corresponding to the plurality of groups by performing cylinder fitting by using the first vertices grouped into a same group;

obtaining a second cylinder by merging the first cylinders;

obtaining, from among the vertices of the scan data, second vertices corresponding to side surfaces of the second cylinder; and recognizing the second vertices as the inner region of the hole.

6. The image processing method of claim 5, wherein the grouping of the first vertices into the plurality of groups includes grouping of the first vertices into the plurality of groups by grouping the first vertices with vertices within a predetermined distance into a same group.

7. The image processing method of claim 5, wherein the obtaining of the second vertices corresponding to the side surfaces of the second cylinder among the vertices of the scan data includes obtaining vertices within a predetermined distance from the side surfaces of the second cylinder as the second vertices.

8. The image processing method of claim 1, further comprising: displaying the recognized inner region of the hole to be distinguished from other regions.

9. The image processing method of claim 1, further comprising: processing the scan data based on the recognized inner region of the hole.

10. An image processing apparatus comprising:

a memory storing one or more instructions; and a processor, wherein the processor is configured to execute the one or more instructions stored in the memory to:

obtain scan data by scanning an object including a hole, wherein the scan data includes a portion of an inner region of the hole, obtain, from the scan data, at least one parameter for recognizing the inner region of the hole, recognize the inner region of the hole from the scan data based on the obtained at least one parameter, delete the inner region of the hole in the scan data; and obtain, based on the scan data from which the inner region of the hole has been deleted, a final image indicating a form in which the hole is filled with a filler, wherein the object includes an abutment including a screw hole.

11. The image processing apparatus of claim 10, wherein the processor is configured to execute the one or more instructions stored in the memory to obtain the at least one parameter including curvature information of vertices included in the scan data.

12. The image processing apparatus of claim 11, wherein the processor is configured to execute the one or more instructions stored in the memory to obtain curvature information of each of the vertices, and the curvature information includes a maximum curvature value and a minimum curvature value at each of the vertices.

13. The image processing apparatus of claim 12, wherein the processor is configured to execute the one or more instructions stored in the memory to obtain first vertices having the maximum curvature value within a predetermined first range and the minimum curvature value within a predetermined second range among the vertices, and recognize the inner region of the hole based on the first vertices.

14. The image processing apparatus of claim 13, wherein the processor is configured to execute the one or more instructions stored in the memory to group the first vertices into a plurality of groups, obtain first cylinders respectively corresponding to the plurality of groups by performing cylinder fitting by using the first vertices grouped into a same group, obtain a second cylinder by merging the first cylinders, obtain, from among the vertices of the scan data, second vertices corresponding to side surfaces of the second cylinder, and recognize the second vertices as the inner region of the hole.

15. The image processing apparatus of claim 14, wherein the processor is configured to execute the one or more instructions stored in the memory to group of the first vertices into the plurality of groups by grouping the first vertices with vertices within a predetermined distance into a same group.

16. The image processing apparatus of claim 14, wherein the processor is configured to execute the one or more instructions stored in the memory to obtain vertices within a predetermined distance from the side surfaces of the second cylinder as the second vertices.

17. The image processing apparatus of claim 10, further comprising: a display, wherein the processor is configured to execute the one or more instructions stored in the memory to control the display to display the recognized inner region of the hole to be distinguished from other regions.

18. A non-transitory computer-readable recording medium having recorded thereon a program including at least one instruction which, when executed by a computer, performs an image processing method, the image processing method comprising:

obtaining scan data by scanning an object including a hole, wherein the scan data includes a portion of an inner region of the hole;

obtaining, from the scan data, at least one parameter for recognizing the inner region of the hole;

recognizing the inner region of the hole from the scan data based on the obtained at least one parameter;

deleting the inner region of the hole in the scan data; and obtaining, based on the scan data from which the inner region of the hole has been deleted, a final image indicating a form in which the hole is filled with a filler, wherein the object includes an abutment including a screw hole.

* * * * *